Figure 1:
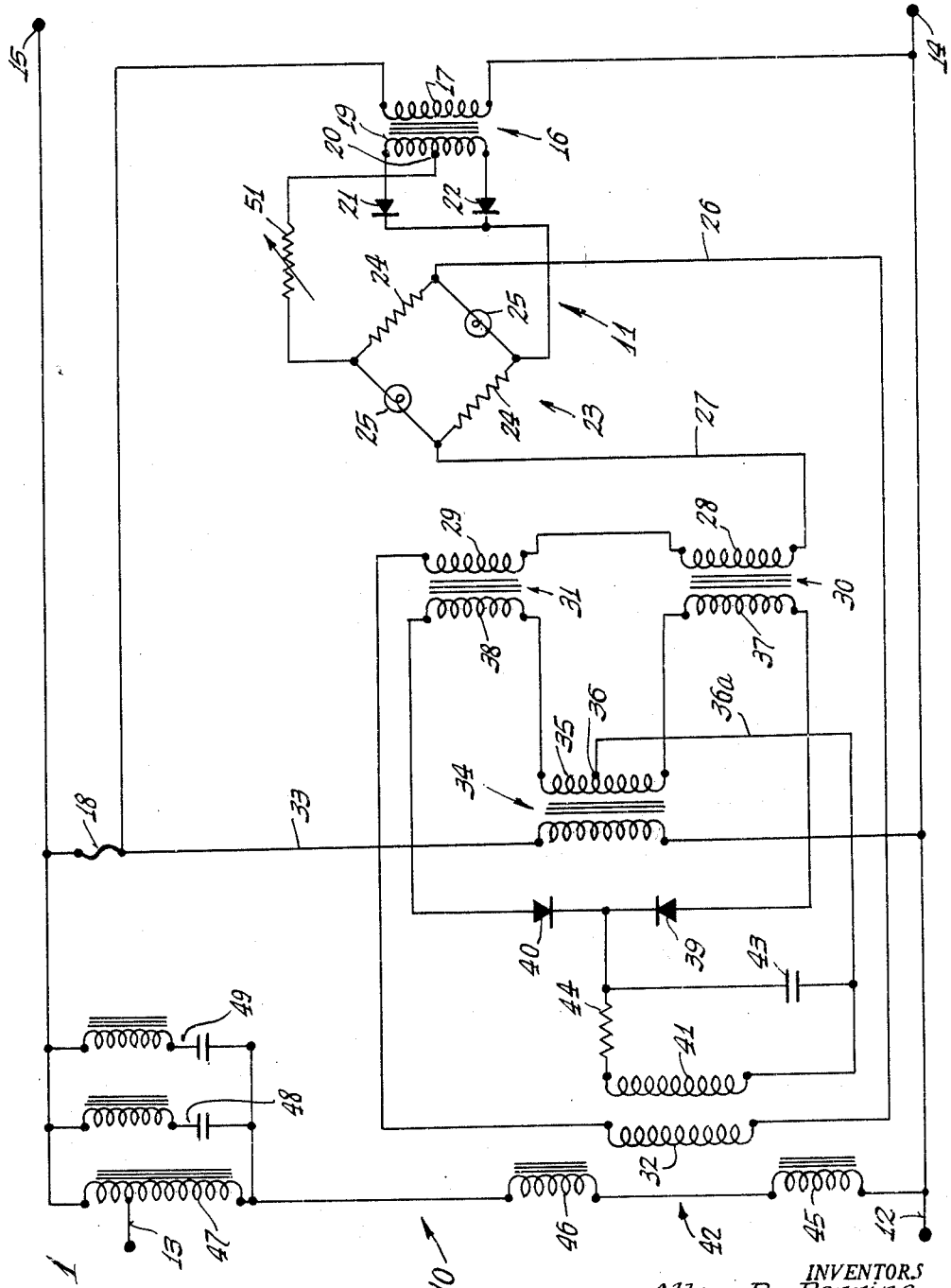

INVENTORS
Allen R. Perrins
Eric W. Vaughan
BY
Johnson and Kline
ATTORNEYS 3,152,300
SENSING CIRCUIT HAVING A UNIDIRECTIONAL,
REVERSIBLE POLARITY OUTPUT SIGNAL
Allen R. Perrins, Cheshire, and Eric W. Vaughan, Bristol,
Conn., assignors to The Superior Electric Co., Bristol,
Conn., a corporation of Connecticut
Filed Feb. 5, 1957, Ser. No. 638,413
16 Claims. (Cl. 323—75)

The present invention relates to a sensing circuit for detecting deviations in an alternating-current voltage from a nominal or preselected value and, more particularly, to a sensing circuit which has a unidirectional, reversible polarity, output signal.

An object of the present invention is to provide a sensing circuit for detecting the deviation of an alternating-current voltage from a preselected value and for providing a unidirectional, reversible polarity, signal having a value which is a function of the amount of deviation of the voltage from its preselected value both in magnitude and direction.

Another object of the present invention is to provide a sensing circuit of the above type which responds to deviations in the R.M.S. or effective value of the alternating-current voltage from a nominal value thereof.

A further object of the present invention is to provide a sensing circuit in which there are nonlinear impedance elements whose resistance varies with the voltage impressed thereacross and to utilize the change in resistance to produce a unidirectional signal which is related in magnitude to the impressed voltage and is indicative of the deviation of the voltage from a preselected value.

Another object of the present invention is to provide an automatic voltage regulator incorporating the sensing circuit in which the sensing circuit it utilized as the measuring unit and in which the output of the circuit can be utilized directly to control the regulating unit of the regulator.

A feature of the invention resides in a bridge circuit having nonlinear impedances across which is impressed a unidirectional voltage having an R.M.S. or effective value equal to the alternating-current voltage or which is directly proportional to the A.C. voltage. The bridge, in the instant embodiment shown, has two opposite legs having fixed impedance elements and the nonlinear impedance elements in the other pair of opposite legs. In the operation of the bridge, at a selected value of alternating current voltage, the bridge is balanced and the signal from the bridge is zero but with variations in the alternating-current voltage from this preselected value, the signal will bear a function which is directly related to the magnitude and also be indicative of the deviation of the alternating-current voltage from its preselected value. By impressing the R.M.S. value of the alternating-current voltage across the bridge, the nonlinear impedances function the same as if alternating-current voltage is impressed thereacross but by using unidirectional voltage, the signal from the bridge can be directly employed to actuate transductors and also the direction of deviation of the alternating-current voltage from its preselected value is indicated by the polarity of the signal.

The sensing circuit of the present invention is shown schematically in the accompanying drawing as it may be utilized in an automatic alternating-current voltage regulator. The sensing circuit of the present invention has particular utility therewith since the output of the bridge circuit may be used directly to control transductors such as a magnetic amplifier as shown or a vacuum type amplifying circuit. However the invention is not to be considered limited for use only with a voltage regulator since other uses will be apparent.

Figure 2:
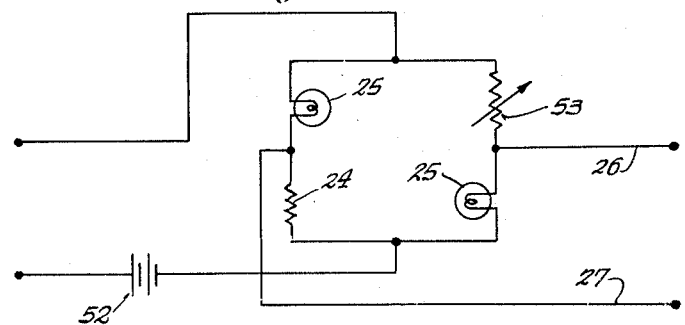
Figure 3:
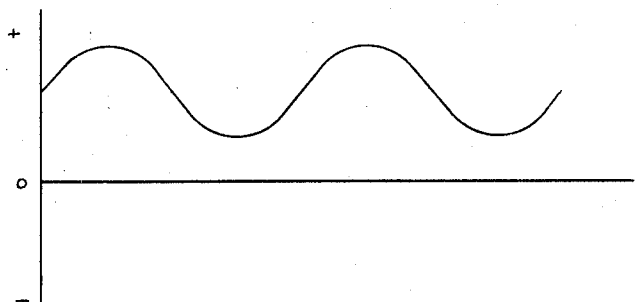
Figure 4:
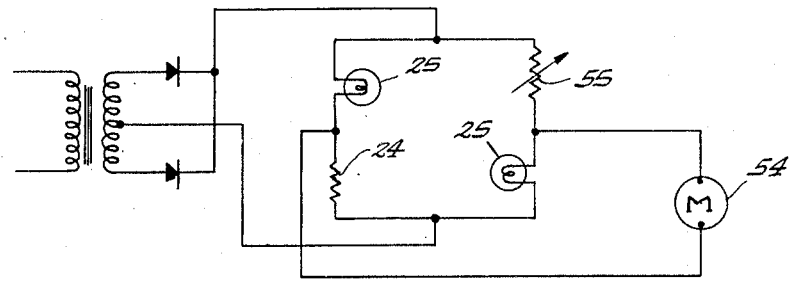

In the drawings:
FIGURE 1 is a schematic diagram of the invention as incorporated in a voltage regulator.
FIG. 2 is another embodiment of the sensing circuit.
FIG. 3 is a curve showing the input voltage to the bridge of FIG. 2.
FIG. 4 is a further embodiment of the present invention.

Referring to FIGURE 1, the automatic voltage regulating circuit is generally indicated by the reference numeral 10 and the sensing circuit is indicated by the reference numeral 11. The regulating circuit 10 is provided with a pair of input connections 12 and 13 and a pair of output connections 14 and 15. The supply voltage is connected to the input connections while the load is taken across the output connections. The load voltage is maintained substantially constant through a range of variations in the supply voltage.

The sensing circuit of the present invention in the particular embodiment illustrated is placed in parallel with the output connections in order that it may respond to the output voltage. While the sensing circuit may be, in some instances, connected directly across the output, in the instant embodiment a transformer 16 is utilized to isolate the sensing circuit and also to provide the requisite A.C. voltage for the sensing circuit. The transformer ratio may be unity, step-up or step-down depending on the A.C. output voltage. Accordingly, a primary winding 17 of the transformer 16 is connected through a fuse 18 across the output connections 14 and 15. A secondary winding 19 of the transformer is tapped as at 20, while the ends of the winding are connected to one-way valves or rectifiers 21 and 22. The output of the rectifiers and the tap 20 may be fed through a resistor 51, which is preferably variable and whose purpose will be later set forth to opposite corners of a Wheatstone bridge 23.

The bridge 23 is provided with a pair of fixed resistance or impedance elements 24, one in each leg of a pair of opposite legs, and in each of the other legs nonlinear impedances 25 are provided. The input of the bridge from the transformer 16 is to one pair of opposite corners and the output signal from the bridge is from the other pair of opposite corners through the leads 26 and 27.

From the above circuitry it will be appreciated that the alternating-current output voltage across the leads 14 and 15 is impressed across the primary winding 17 of the transformer 16 which creates a voltage in the secondary winding 19 which may be equal to or directly proportional to the value of the alternating-current output voltage. The rectifiers 21 and 22 in combination with the tap 20 provide full-wave rectification of the voltage across the winding 19 and this unidirectional voltage is impressed on the bridge 23. This unidirectional voltage has a value which is equal to, or directly proportional to, the R.M.S. or effective value of the alternating-current output voltage and, accordingly, includes the value of any harmonics present in the output voltage. The fixed elements of the bridge are preferably of materials which do not change their resistance with changes in ambient temperature or current therethrough, in other words obey Ohm's law. The nonlinear impedance elements 25 in the illustrated embodiment are tungsten filament lamps which are known for their nonlinear current characteristics though other known nonlinear elements whose resistance changes with respect to the applied voltage and are generally known as thermally-responsive elements may be employed, and may include carbon lamps, thermistors, etc.

The values selected for the impedances 24 and 25 are such that at a preselected value of alternating-current output voltage, the bridge will be balanced and there will be no potential across the leads 26 and 27. However, any deviation of the output voltage from the preselected value causes a signal voltage across the leads whose magnitude and polarity is related to the deviation from the preselected alternating-current output voltage. In the bridge circuit illustrated herein over the operating range of the supply voltage the value of the signal voltage across the leads is substantially directly proportional to the amount of deviation. Moreover, the direction of deviation of the output voltage will be indicated by a change in the polarity of the voltage as one of the leads may be positive when the output voltage is greater than the preselected value and negative when it is less than the preselected value.

In the illustrated embodiment, the signal voltage from the bridge is fed into an amplifying unit which forms a part of the regulating unit of the regulator to regulate the alternating-current output voltage. Accordingly, the lead 27 is connected in series with control windings 28 and 29 of magnetic amplifiers or transductors 30 and 31, respectively. In addition, a feedback winding 32 of another transductor 42 is positioned in series with the leads 26 and 27. In order to provide the necessary power for the regulating unit, a lead 33 connects a primary winding of a transformer 34 through the fuse 18 across the output connections. A secondary winding 35 of the transformer 34 is tapped as at 36 and a lead 36a connects the tap to a control winding 41 of the transductor or saturable reactor 42. The ends of the winding 35 are connected to gate windings 37 and 38 of the transductors 30 and 31 respectively, which, in turn, are connected to one-way valves or rectifiers 39 and 40. The output of the rectifiers is connected through a coupling network to the other end of the winding 41. The coupling network consists of a capacitor 43 and a resistor 44. The transformer 34 and the rectifiers 39 and 40 provide full wave rectification on the alternating current flowing through the gate windings 37 and 38 and the flow of this current is dependent upon the value of the signal voltage from the bridge 23.

The saturable reactor 42 has a pair of gate windings 45 and 46 connected to one end of the coil of an autotransformer 47. The input connection 13 is connected to a tap on the coil of the autotransformer. The autotransformer 47 and the saturable reactor 42 constitute a potential divider through which the input is fed and the output voltage controlled in a manner that is well known in the art. A pair of series resonant circuits 48 and 49 shunt the autotransformer and are preferably constructed to resonate at the third and fifth harmonic of the supply frequency to filter these harmonics from the output during the operation of the unit. In order to enable adjustment of the preselected value of alternating-current output voltage, the resistor 51 is provided. By varying the resistance of this element the value of the unidirectional voltage across the bridge may be set so that at the preselected value of alternating-current output voltage this unidirectional voltage will have a value that corresponds to the value at which the bridge balances. Moreover, the resistor 51 provides a means for compensating for variations from the ideal performance of the various elements. If desired, however, the resistor 51 may be set so that the bridge is balanced at a preselected alternating-current output voltage which may not be the desired output voltage. Thus, for example, if the desired output voltage is 115 volts, the bridge may be set to be balanced at 114.5 volts, the latter being referred to throughout the application as the preselected output voltage.

While in the instant embodiment there is shown two nonlinear impedances in the bridge, it is within the scope of the present invention to utilize a bridge which may have one, two, three or more nonlinear impedances depending on what characteristics it is desired to have the bridge possess.

There has thus been disclosed a sensing unit which may be employed to detect deviations of an alternating-current voltage from a preselected value. By means of the present invention, a unidirecitonal, reversible polarity signal from the output from the bridge is indicative of both the magnitude and the direction of the deviation of the A.C. voltage from the preselected value. Moreover, a unidirectional voltage is utilized to cause unbalance of the bridge and this unidirectional voltage has an R.M.S. or effective value equal or proportional to the alternating-current output voltage and thus acts upon the non-linear elements in the bridge the same as would the alternating-current voltage. However, by utilizing a unidirectional voltage both the signal voltage and the unbalancing voltage may be derived from the same source thereby eliminating complex circuitry which provides a separate source for the signal voltage and a separate source for the unbalancing voltage. In one of the disclosed embodiments of the invention, the signal voltage from the bridge is directly connected to transductors in the regulating unit of an automatic alternating-current voltage regulator and thus provides a simplified circuit which provides positive regulation of the alternating-current output voltage even over a long period of time with a minimum number of elements.

In FIG. 2, like elements have been indicated by the same reference numerals. However a variable resistance 53 is used to vary the bridge balancing position and is in one of the fixed impedance legs of the bridge. In this embodiment, the input voltage consists of an A.C. voltage superimposed on a D.C. so that the input is a unidirectional though pulsating D.C. Accordingly a battery 52 is provided which provides a steady unidirectional biasing source whose potential is larger than the peak voltage of the applied A.C. voltage. This is shown graphically in FIG. 3, which depicts the bridge input voltage and illustrates that the A.C. voltage is always unidirectional. Though a battery is shown other known steady D.C. sources may be utilized.

FIG. 4 illustrates the sensing circuit in which the unidirectional output may be fed to a D.C. meter 54 for indicating the magnitude and direction of the deviation of the A.C. voltage from a preselected level. This circuit is the same as that described in FIG. 1 except that the variable resistor 55 constitutes one of the fixed impedance elements.

Variations and modifications may be made within the scope of the claims and portions of the improvements may be used without others.

We claim:

1. A sensing circuit for supplying a unidirectional output signal which is a function of the deviation of an alternating-current voltage from a preselected R.M.S. value comprising means having a selected output signal value when there is no deviation of the alternating-current voltage from its preselected value and varying from said value in relation to the deviation in the alternating-current voltage from its preselected R.M.S. value, and means for impressing on the first named means a substantially unidirectional voltage having an R.M.S. value related to the R.M.S. value of the alternating-current voltage for creating a unidirectional flow of current in said first named means and for producing an output signal, said unidirectional voltage being the only voltage impressed on said first-named means.

2. A sensing circuit for supplying a unidirectional output signal which is a function of the deviation of an alternating-current voltage from a preselected R.M.S. value comprising means having a selected output signal value when there is no deviation of the alternating-current voltage from its preselected value and varying from said value in relation to the deviation in the alternating-current voltage from its preselected R.M.S. value, and means for impressing on the first named means a substantially unidirectional voltage having an R.M.S. value substantially proportional to the R.M.S. value of the alternating-current voltage for creating a unidirectional flow of current in said first named means and for producing an output signal which is substantially proportional to the deviation, said unidirectional voltage being the only voltage impressed on said first-named means.

3. A sensing circuit for supplying a unidirectional signal which bears a constant relation to and is indicative of the deviation of an alternating-current voltage from a preselected R.M.S. value comprising means having a selected output signal value when there is no deviation of the alternating-current voltage from its preselected value and varying from said value in relation to the deviation in the alternating-current voltage from its preselected R.M.S. value, and means for impressing on the first named means a substantially unidirectional voltage having an R.M.S. value related to the R.M.S. value of the alternating-current voltage for creating a unidirectional flow of current in said first named means and for producing an output signal which is proportional to and polarized to indicate the deviation, said unidirectional voltage being the only voltage impressed on said first-named means.

4. A reference circuit for supplying a signal proportional to the deviation of an alternating-current voltage from a preselected value comprising a bridge circuit having a pair of opposite legs including at least one nonlinear impedance element and fixed linear impedance elements in the other pair of opposite legs, input connections on two opposite corners of said bridge circuit, output terminals connected to the other two opposite corners of said bridge circuit, and means for impressing a unidirectional voltage on said input connections of said bridge circuit having an R.M.S. value equal to the R.M.S. value of the alternating-current voltage value to produce a unidirectional current in the bridge, said bridge circuit being balanced at said preselected alternating-current voltage value with the impedance of said nonlinear impedance element varying in response to variations in said unidirectional voltage thereby producing a voltage across output terminals substantially proportional to the deviation in the said alternating-current voltage from preselected value, said unidirectional voltage being the only voltage impressed on said bridge circuit.

5. A reference circuit for supplying a signal proportional to the deviation of an alternating-current voltage from a preselected value comprising a bridge circuit having nonlinear impedance elements in a pair of opposite legs and fixed linear impedance elements in the other pair of opposite legs, input connections on two opposite corners of said bridge circuit, output terminals connected to the other two opposite corners of said bridge circuit, and means for impressing a unidirectional voltage at said input of said bridge circuit having an effective value linearly proportional to the effective value of the alternating-current voltage value to produce a unidirectional current in the bridge, said unidirectional voltage being the only voltage impressed on said bridge circuit, said bridge circuit being balanced at said preselected alternating-current voltage value with the impedance of said nonlinear impedance elements varying in response to variations in said unidirectional voltage thereby producing a voltage across the output terminals substantially proportional to the deviation in the said alternating-current voltage from preselected value.

6. A reference circuit for supplying a unidirectional signal proportional to and indicative of the deviation of an alternating-current voltage from a preselected value comprising a bridge circuit having nonlinear impedance elements in a pair of opposite legs and fixed linear impedance elements in the other pair of opposite legs, input connections on two opposite corners of said bridge circuit, output terminals connected to the other two opposite corners of said bridge circuit, and means for impressing a unidirectional voltage at said input of said bridge circuit having an R.M.S. value proportional to the R.M.S. value of alternating-current voltage to produce a unidirectional current in the bridge, said unidirectional voltage being the only voltage impressed on said bridge circuit, said bridge circuit being balanced at said preselected alternating-current voltage value with the impedance of said nonlinear impedance elements varying in response to variations in said unidirectional voltage thereby producing a unidirectional voltage across said output terminals substantially proportional to the deviation in the said alternating-current voltage from preselected value and polarized to indicate the direction of said deviation.

7. The invention as defined in claim 4 in which the nonlinear impedance element is a thermally-responsive element.

8. The invention as defined in claim 4 in which the means includes at least one rectifier and leads adapted to connect the input of the rectifier across the alternating-current voltage and the output of the rectifier to the input connections of the bridge.

9. The invention as defined in claim 4 in which the means includes full-wave rectifier means and a transformer with the output of the transformer connected to the rectifier means and the input of the transformer adapted to be connected across the alternating-current voltage.

10. The invention as defined in claim 4 in which there are means in said circuit for adjusting the preselected value of the alternating-current voltage.

11. An alternating-current voltage regulator for maintaining an alternating-current output voltage at a substantially constant preselected value comprising means having a unidirectional output signal value when there is no deviation of the alternating-current voltage from its preselected value and varying said signal value in relation to the deviation in R.M.S. value of the alternating-current voltage from its preselected value, means for impressing on the first named means a unidirectional voltage having an R.M.S. value related to the said alternating-current output voltage for creating a unidirectional flow of current in said first named means and for producing the unidirectional output signal, said unidirectional voltage being the only voltage impressed on said first-named means, a transductor having an input for receiving the unidirectional output signal and an output, and regulating means connected to the transductor output for adjusting the value of the output voltage of the regulator to the preselected value of alternating-current output voltage.

12. An alternating-current voltage regulator for maintaining an alternating-current output voltage at a substantially constant preselected value comprising means having a unidirectional output signal value when there is no deviation of the output voltage from its preselected value and varying said signal value both in magnitude and polarity in relation to the deviation in the alternating-current voltage from its preselected R.M.S. value, means for impressing on the first named means a substantially unidirectional voltage having an R.M.S. value related to the R.M.S. value of the alternating-current output voltage for creating a unidirectional flow of current in said first named means and for producing the unidirectional output signal which varies in magnitude and polarity as the deviation varies, said unidirectional voltage being the only voltage impressed on said first-named means, a transductor having an input for receiving the unidirectional output signal and an output, and regulating means connected to the transductor output for adjusting the value of the output voltage of the regulator to the preselected value of alternating-current output voltage.

13. An alternating-current voltage regulator for maintaining an alternating-current output voltage at a substantially constant preselected value comprising a bridge circuit having a pair of opposite legs including at least one nonlinear impedance element and fixed linear impedance elements in the other pair of opposite legs, input connections on two opposite corners of said bridge circuit, output terminals connected to the other two opposite corners of the bridge circuit, means for impressing a substantially unidirectional voltage at said input of the bridge circuit having an R.M.S. value related to the R.M.S. value of the alternating-current voltage for creating a unidirectional flow of current in the bridge and for producing the unidirectional output signal, a transductor having an input for receiving the unidirectional output signal and an output, said unidirectional voltage being the only voltage impressed on said bridge circuit, and regulating means connected to the transductor output for adjusting the value of the output voltage of the regulator to the preselected value of alternating-current output voltage.

14. The invention as defined in claim 13 in which the impressing means comprises a full-wave rectifier, a transformer, and leads for connecting the transformer input to the alternating-current output voltage and the transformer output to the rectifier.

15. The invention as defined in claim 14 in which the nonlinear impedance elements are thermally-responsive elements.

16. The invention as defined in claim 1 in which the last-named means includes a steady unidirectional biasing source whose potential is larger than the peak value of the alternating-current voltage.

References Cited in the file of this patent

UNITED STATES PATENTS

| | | |
|---|---|---|
| 2,594,022 | Horton | Apr. 22, 1952 |
| 2,740,936 | Anderson | Apr. 3, 1956 |
| 2,753,512 | Helterline | July 3, 1956 |
| 2,791,740 | McKenna | May 7, 1957 |
| 2,809,341 | Silver | Oct. 8, 1957 |
| 2,825,864 | Eagan | Mar. 4, 1958 |